United States Patent [19]

Baversten

[11] Patent Number: 5,323,435
[45] Date of Patent: Jun. 21, 1994

[54] CONTROL ROD HOUSING SUPPORT BARS WITH WING ASSEMBLIES

[75] Inventor: Bengt I. Baversten, Weatogue, Conn.

[73] Assignee: Combustion Engineering Inc., Windsor, Conn.

[21] Appl. No.: 92,064

[22] Filed: Jul. 16, 1993

[51] Int. Cl.[5] ............................................. G21C 19/00
[52] U.S. Cl. .................................. 376/463; 376/219; 376/239; 376/277; 376/287
[58] Field of Search ............... 376/463, 287, 219, 239, 376/277

[56] References Cited

U.S. PATENT DOCUMENTS

| | | | |
|---|---|---|---|
| 4,752,434 | 6/1988 | Savary | 376/239 |
| 4,820,058 | 4/1989 | Wilson et al. | 376/277 |
| 4,859,409 | 8/1989 | Matusz et al. | 376/463 |
| 4,888,149 | 12/1989 | Bryan | 376/287 |

Primary Examiner—Donald P. Walsh
Assistant Examiner—Frederick H. Voss
Attorney, Agent, or Firm—Ronald P. Kananen; John H. Mulholland

[57] ABSTRACT

A boiling water reactor control rod drive housing support bars having wing assemblies to limit the travel of a control rod in the event that a control rod housing is ruptured. The wing assemblies are placed on support bars located in rows on opposing sides of the control rod drives. Each wing on the wing assemblies supports a quadrant of a control rod drive. The wing assemblies may be rotated from an operation position to a service position to allow replacement of the control rod drives.

20 Claims, 6 Drawing Sheets

CONTROL ROD HOUSING SUPPORT BARS WITH WING ASSEMBLIES

BACKGROUND OF INVENTION

1. Field of the Invention

This invention relates to supports and, more particularly, to boiling water reactor control rod drive housing supports. Still more particularly, this invention relates to control rod drive housing supports with wing assemblies to limit the travel of a control rod in the event that a control rod housing is ruptured, which do not have to be removed during replacement of a control rod drive.

2. Description of Prior Art

In boiling water reactors the control rod drive housing supports are generally located underneath the reactor vessel near the control rod housings. The control rod drive housing supports limit the travel of and support a control rod in the event that a control rod drive housing is ruptured. The supports prevent a nuclear excursion as a result of a housing failure, thus protecting the fuel barrier.

Typically, control rod drive housing supports consist of hanger rods that are attached and supported at their upper end at a beam structure immediately underneath the reactor pressure vessel and support bars which are bolted between the hanger rods below the control rod drives. Another grid of bars is installed on the support bars to transfer the load of a ruptured control rod drive housing to the support bars. Generally, a pair of grid bars support each control rod drive. Each pair of grid bars are held together by two grid clamps and a bolt.

In this support system of the prior art, when it is necessary to change or replace a control rod drive, the grid bars must be removed. In order to remove the grid bars the operator must manually unscrew the grid clamp bolt, remove the two grid clamps and then remove the grid bars, each weighing approximately forty pounds. The number of grid bars which must be removed depends on the number of control rods which must be replaced. Furthermore, since the grid bars are interlocking, they must be removed starting from the outer peripheral row. Thus, if a large number of control rod drives must be replaced or if an inner control rod drive must be replaced, a large number of grid bars must be removed. The result is a time consuming and cumbersome process. Moreover, as the grid bars are heavy and awkward to handle, a dropped bar could result in serious injury. Further still, the persons handling the grid bars are subject to substantial radiation doses. The more time a person must spend replacing the control rod drives, the more that person is subject to radiation.

Thus, it is a problem in the prior art to adequately support a control rod drive housing in a boiling water reactor while allowing for quick and easy replacement of control rod drives and reducing and minimizing the amount of radiation exposure resulting from such replacement.

SUMMARY OF THE INVENTION

It is an object of the present invention to support a control rod drive housing in the event that a control rod housing is ruptured while at the same time allowing quick and easy replacement of a control rod drive.

It is another object of the present invention to provide a control rod drive housing support which minimizes the amount of radiation which a person is subject to when replacing a control rod drive.

It is another object of the present invention to provide a control rod drive housing support which need not be removed when changing a control rod drive.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, the control rod drive housing support of this invention may comprise a first means for supporting a control rod drive; and a second means for supporting said control rod drive, the second supporting means disposed on the first supporting means wherein the second supporting means is movable on the first supporting means from a support position to a non-support position, whereby the control rod drive is supported by the first and second supporting means when the second means is in the support position and the control rod drive is not supported by the first and second supporting means and can be replaced without removing the second supporting means from the first supporting means when the second supporting means is in said non-support position.

Further, the first supporting means may comprise a plurality of support members provided in rows on opposing sides of a lower portion of a plurality of control rod drives and the second supporting means may comprise a plurality of second support members disposed on the first support members, each of the second support member having a plurality of extension members for supporting the control rod drives. In addition, the first support members may have a plurality of hubs for receiving the plurality of second support members rotatably thereon and the second support members may have a hole therethrough for receiving one of the plurality of hubs rotatably therein.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Reference will now be made in detail to the preferred embodiment of the invention, an example of which is illustrated in the accompanying drawings.

Boiling water reactors use control rods in the reactor vessel for controlling the reaction therein. The control rods are generally contained in a grid-like fashion in a control rod housing with a drive unit for raising the control rods into the assembly of the fuel rods. Located underneath the reactor vessel near the control rod housings are control rod drive housing supports for limiting the travel of a control rod in the event that a control rod housing is ruptured.

Figure 1:
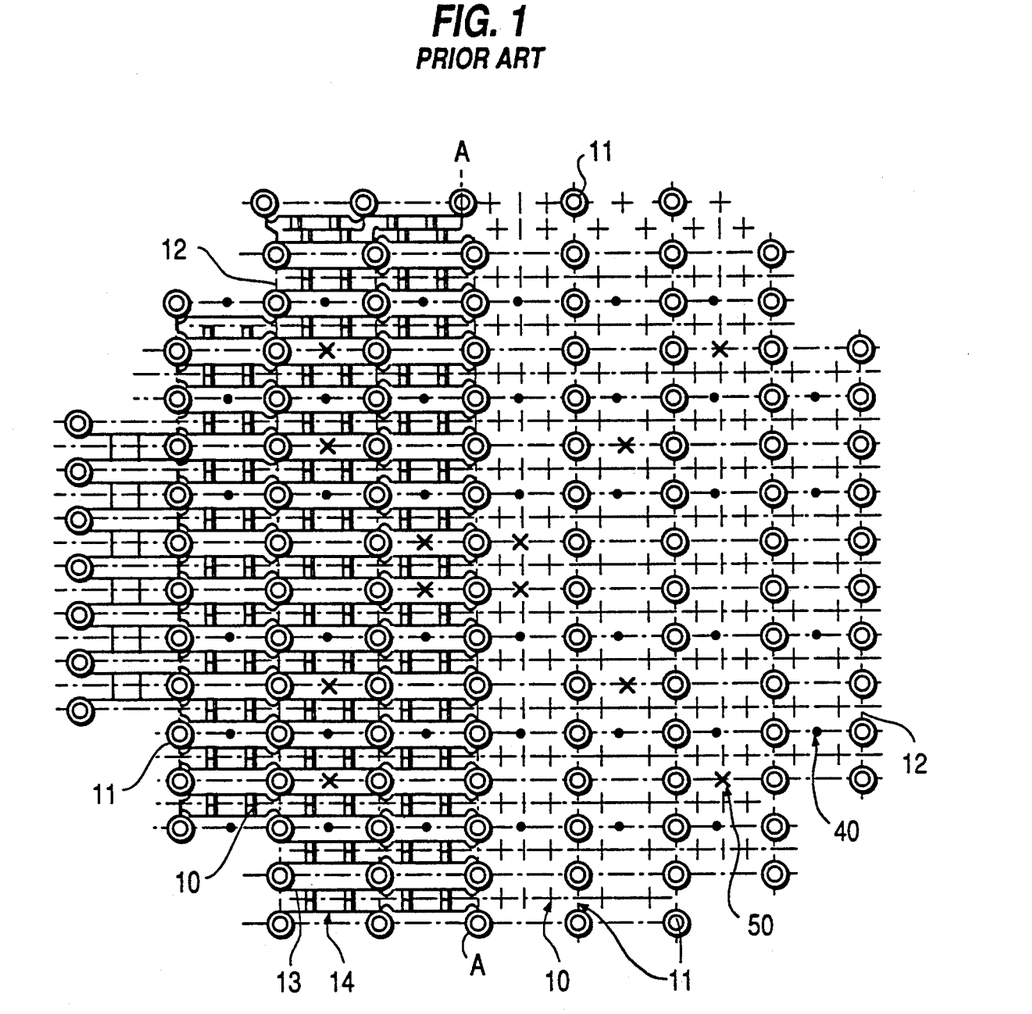
FIG. 1 is a top schematic view of the control rod drive housing supports of the prior art
Figure 2:
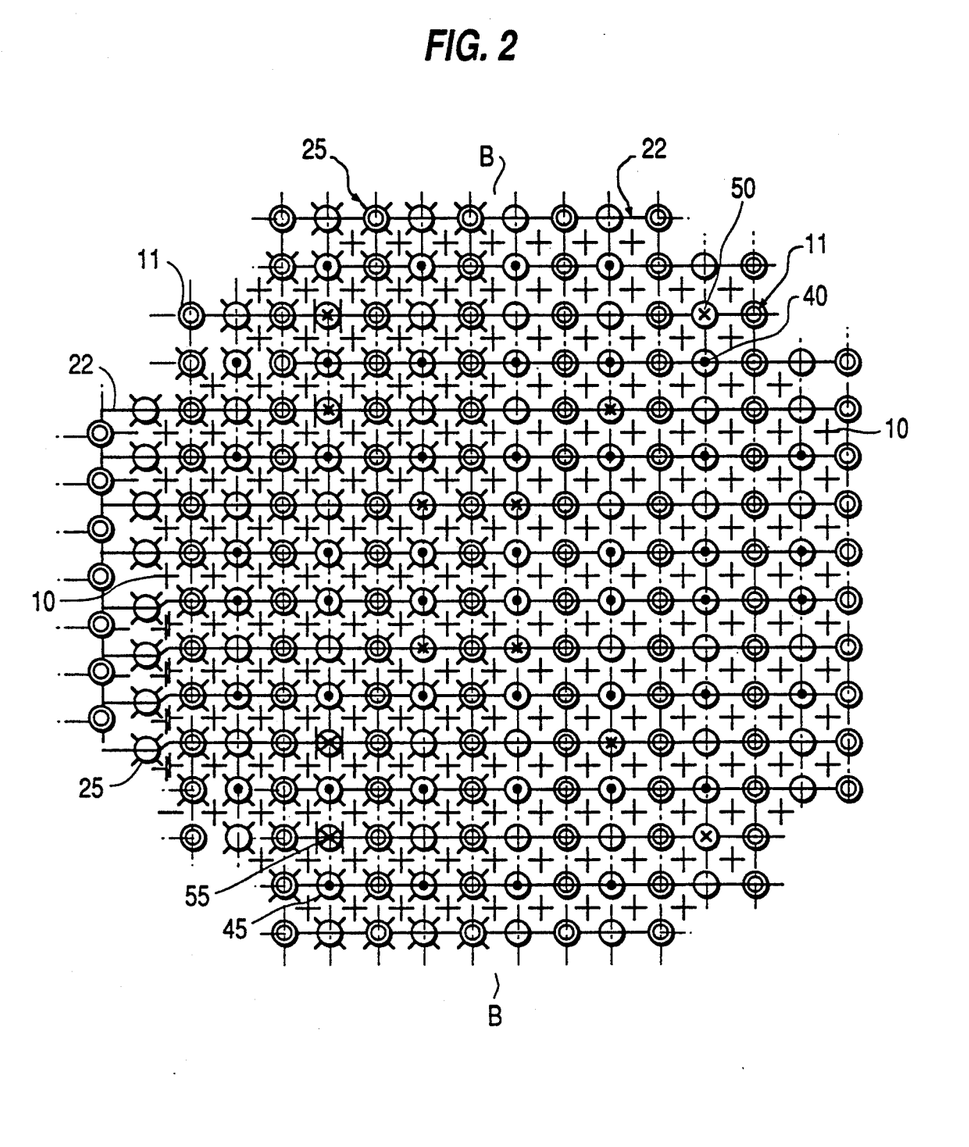
FIG. 2 is a top schematic view of the control rod drive housing supports of the present invention.

A top view of the control rod drive housing supports of the prior art and the present invention are shown in FIGS. 1 and 2, respectively. In FIGS. 1 and 2, the positions shown at 10 illustrate the positions which correspond to a control rod drive.

The control rod drive housing supports of the prior art as shown in FIG. 1, consist of hanger rods 11 supported by a beam underneath the reactor pressure vessel (not shown) spaced throughout the grid of control rod drive positions. Support bars 12 are bolted between the hanger rods 11. Grid bars 13 are installed on the support bars 12 to support the control rod drive and transfer the load of the control rod drive to the support bars 12. Generally, a pair of grid bars 13 support each control rod drive. Each pair of grid bars is held together by two grid clamps 14 and a bolt (not shown).

In FIG. 1, the control drive housing supports of the prior art is shown to the right of line A—A only with the support bars 12 and is shown with the support bars 12 and grid bars 13 to the left of the line A—A. In actual operation, the grid bars 13 would be used throughout the entire housing supports. In order to replace a control rod drive, the grid bars 13 and clamps 14 must be removed. Because the grid bars 13 are interlocking, they must be removed starting from the periphery, resulting in a cumbersome and time consuming process.

Figure 3:
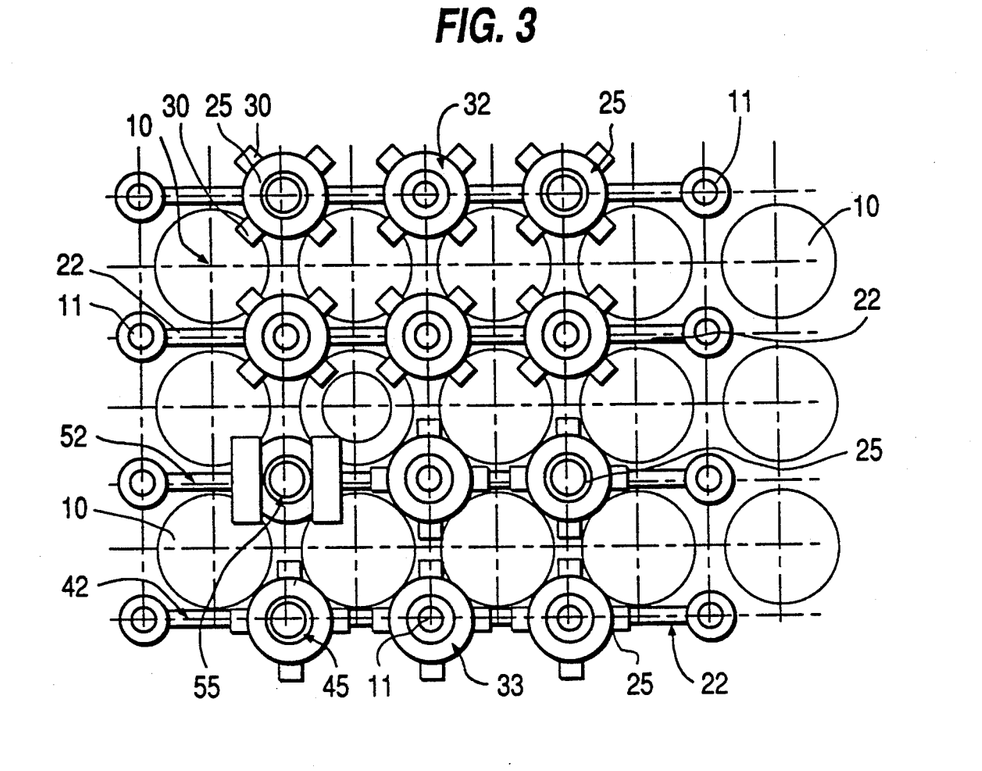
FIG. 3 is a top view of the control rod drive housing supports of the present invention.

With reference to FIGS. 2 and 3, the control rod drive housing supports of the present invention will be described. The control rod drive positions and hanger rods are again shown at 10 and 11, respectively. However, the grid bars 13 and the clamps 14 of the prior art are replaced by assemblies that can perform the same function but can be moved to a nonuse position, rather than removed, when changing the control rod drives. As a result, no heavy steel grid bars must be removed every time a control rod drive is being replaced. Thus, changing of the control rod drives is much easier and faster. Moreover, because the time needed to replace a control rod drive is greatly reduced, the length of time a person changing the control rod drive is subject to radiation is correspondingly reduced.

In the assembly of the present invention the support bars 12 of the prior art are replaced with support bars 22 placed in rows along opposing sides of the control rod drive position and oriented ninety degrees to the old bar support bars 12. An end of each support bar 22 is supported on a hanger rod. Typically, the support bars 12 of the prior art were one foot long. The length of support bars 22 of the present invention may vary depending on the reactor and the placement of the hangers. Preferably, the length of the support bars 22 is two feet.

Each support bar has wing assemblies 25 having four wings 30 disposed thereon for supporting the control rod drives. When the plant is in operation, the wing assembly 25 is oriented in an operating position 32 as shown in FIGS. 1 and 2. One wing 30 of each wing unit 25, when in the operating position 32, supports one quadrant of the control rod drive such that four wings 30 support each control rod drive. When a control rod drive needs to be replaced the wing assembly 25 and wings 30 may be turned to a non-support position 33 as shown in FIG. 2 rather than removed.

The wing assemblies 25 are spaced on the support bar to correspond with the control rod drive positions 10. While the number of wing assemblies on each support bar may vary, generally the support bar is a straight piece of carbon steel having three wing assemblies 25 thereon. Further, the wing assemblies 25 are alternately placed on the hanger rods 11 on which the support bar 22 is attached.

Figure 4:
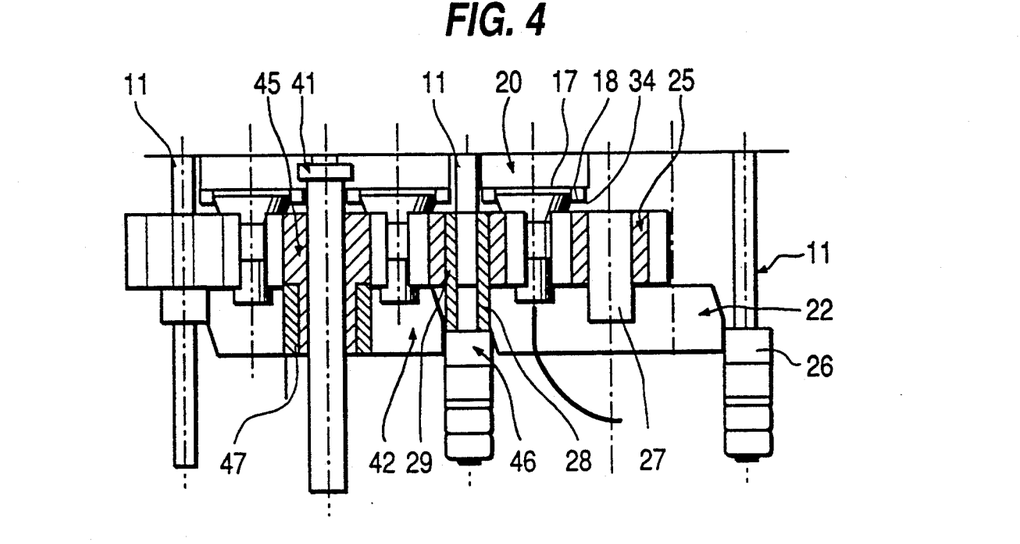
FIG. 4 is side view of two embodiments of the control rod drive housing supports of the present invention and the control rod drives.

The relationship of the support bar 22, the wing assembly 25 and the control rod drive is illustrated in FIG. 4. The lower end of a control rod drive is shown at 20. At its lower end the control rod drive 20 consists of a flange 17 and a flange bolt 18. The wing assembly 25 is shown on the support bar 22 which in turn is provided on the hangers 11. The support bar 22 has a hub 27 thereon for receiving the wing assembly 25. The support bar 22 is provided on a hanger rod 11 at its one end through the wing assembly hub 28 and on another hanger rod 11 at its other end through a hanger rod hub 26.

The wing assembly 25 is also shown on a hanger rod 11 at 29. At a hanger rod 11, the wing assembly 25 is inserted over a hub 28 on the support bar 22 which has been inserted over the hanger rod 11. FIG. 4 also illustrates another wing assembly 45 which will be described in more detail below.

The wing assembly 25 is provided below the control rod drive flange bolt 18 with some clearance to allow for thermal expansion of the control rod drive when the plant is in operation. As a result, a gap 34 exists between the control rod drive flange 17 and flange bolt 18 and the wing assemblies 25. The gap 34 must be sufficient to allow the control rod drive 20 to expand as the system heats up during operation, preferably three quarters of an inch.

When the plant is in operation, the control rod drive 20 expands and the gap 34 between the flange 17 and the bolt 18 and the wings 30 is reduced so that the flange bolt 18 and wing are almost touching. Preferably, the gap is reduced to about one quarter of an inch. Notches can be provided between the wing assembly 25 and the support bar hub 27 to provide an locking means for the wing assemblies 25. As a result, the wing assembly 25 cannot move when the plant is in operation and is thereby locked into the operating position 32. When a control rod drive must be replaced or serviced, the operation of the plant is stopped and the plant cools down. As the control rod drives reduce in size and the gap between the flange 17 and flange bolt 18 and the wing assembly 25 increases to its original clearance. At such clearance the wing assembly 25 may be turned to the non-operating position 33 whereby the wing assembly 25 does not interfere with the service and removal of a control rod drive 20. When the plant is not in operation and the system is cool, the wing assemblies 25 moves freely.

Figure 5A:
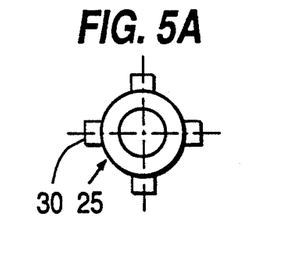
FIG. 5A is a top view of a wing assembly of the control rod drive housing supports according to one of the embodiments of the present invention shown in FIG. 4.
Figure 5B:
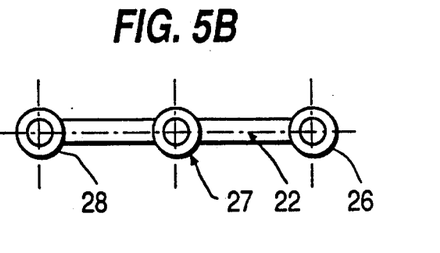
FIG. 5B is a top view of a support bar used with the wing assembly of FIG. 5A.
Figure 5C:
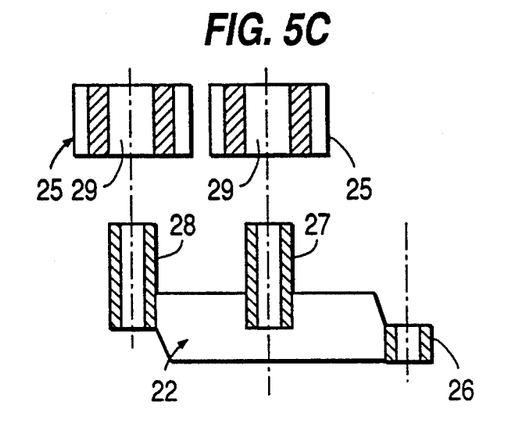
FIG. 5C is a cross-sectional side view of the wing assembly and support bar of FIGS. 5A and 5B.

The relationship of the wing assembly to the support bar 22 is shown in more detail in FIGS. 5A, 5B and 5C. FIG. 5A is a top view of the wing assembly 25 including wings 30. In FIG. 5B, a top view of the support bar 22 and the hubs 26, 27 and 28 are shown. The hub 27 supports the wing assembly 25 between hanger rod positions 11. A side view of the support bar 22 with hubs 26, 27 and 28 and wing assemblies 25 is shown in FIG. 5C. The wing assemblies 25, for purposes of illustrating the relationship of the wing assembly 25 to the support bar 22, are shown above the support bar 22. The hubs 26 and 28 have a hole therethrough sized to fit around the hanger rods 11. The wing assembly 25 has a hole 29 therethrough sized to fit over the hubs 27 and 28. In operation, as shown in FIG. 4, the hanger rods 11 support the support bars 22 which in turn supports the wing assemblies 25.

The present invention includes two alternative wing assemblies to cover various situations around the control rod drive. For example, core detectors may be placed throughout the grid of control rod drives. Specifically Start-up Range Monitor/Intermediate Range Monitors ("SRM/IRM") core detector and Local Power Range Monitors ("LPRM") core detector may be provided throughout the grid of control rod drives to monitor the reactor core. While the alternative wing assemblies will be described in connection with a SRM/IRM detector and LPRM detector, the invention may be used with other instruments. Typically, the SRM/IRM and LPRM detectors are placed at the positions shown at 40 and 50, respectively in FIGS. 1, 2 and 3. Due to the nature of these detectors, alternate wing assemblies may be used in conjunction with these detectors.

Figure 6A:
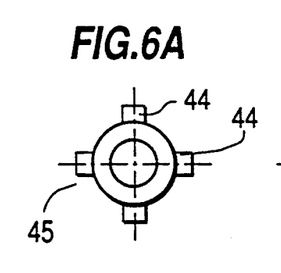
FIG. 6A is a top view of a wing assembly of the control rod drive housing supports according to another of the embodiments of the present invention shown in FIG. 4.
Figure 6B:
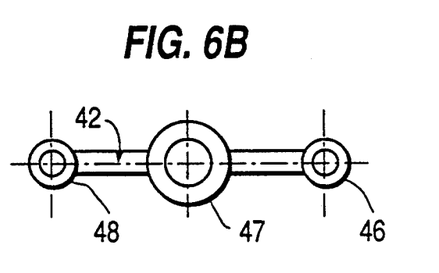
FIG. 6B is a top view of a support bar used with the wing assembly of FIG. 6A.
Figure 6C:
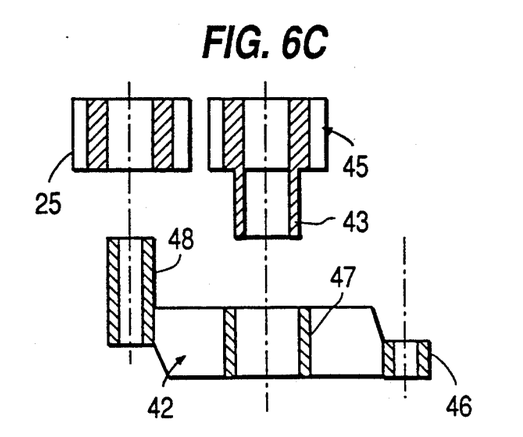
FIG. 6C is a cross-sectional side view of the wing assembly and support bar of FIGS. 6A and 6B.

An LPRM detector 40 having a flange 41 is shown in FIG. 4, with a LPRM position wing assembly 45 on a LPRM position support bar 42. The LPRM position wing assembly 45, as shown, is installed around the LPRM detector 40. The LPRM position wing assembly 45 and support bar 42 are also illustrated in FIGS. 6A, 6B and 6C. FIG. 6A is a top view of the LPRM position wing assembly 45 having wings 44. FIG. 6B is a top view of the support bar 42 having hubs 46 and 48 and a throughhole 47. FIG. 6C is a side view of the wing assemblies 25 and 45 and the support bar 42. Like the support bar 22, the support bar 42 has a hub 48 for placement over a hanger rod 11 and for receiving a wing assembly 25 and a hub 46 for placement over a hanger rod 11. Support bar 42, however, is provided with a throughhole 47 rather than a hub. The hole 47 is sized to receive an extension 43 of the LPRM position wing assembly 45. In turn, a hole 49 is provided through the wing assembly 45 which is sized to receive the LPRM detector 40 or another instrument therethrough.

In use, the LPRM detector 40 extends through the wing assembly 45 and the support bar 42. The wing assembly 45 rotates on the LPRM detector 40 from a non-support position to a support position and vice versa. Notches may also be provided between the support bar 42 and wing assembly 45 and extension 43 to further retain the wing assembly 45 in a support position during operation of the plant. As a result, the control rod drives can be serviced or replaced without removing the LPRM detectors.

Figure 7:
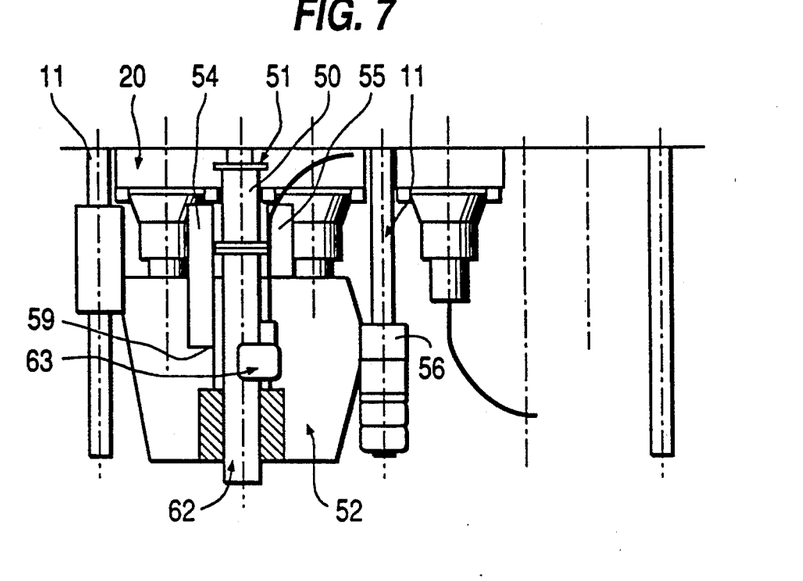
FIG. 7 is side view of another embodiment of the control rod housing supports of the present invention.

An SRM/IRM detector 50 having a flange 51 is shown in FIG. 7 with an SRM/IRM position wing assembly 55 on an SRM/IRM position support bar 52. The SRM/IRM detector has a drive unit 62 and a gear box 63 associated therewith. Because of the shape of the SRM/IRM detector 50 and gear box 63, the detector 50 may interfere with the operation of the previously described wing assembly 25 such that rotation of that assembly may not be possible. As a result, depending on the size of the SRM/IRM unit, it may not be possible to use the wing assembly 25 or 45 because it may not be possible to move the wing assembly to a position which does not interfere with the control rods 20. With such an event a wing assembly 55 having two removable wing blocks 54 may be employed. As shown in FIG. 7, the wing assembly 55 is located between the flange 51 and the gear box 63.

Figure 8A:
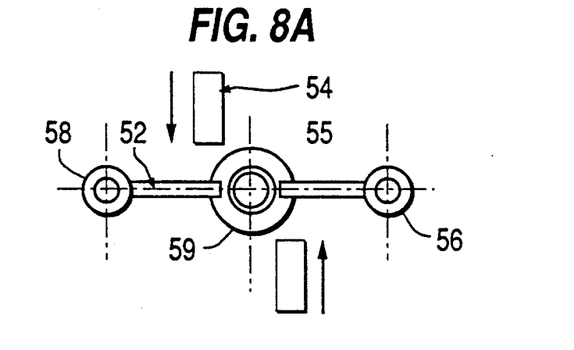
FIG. 8A is a top view of the removable wing assembly and the support bar of the control rod housing supports of the present invention according to the embodiment of FIG. 7.
Figure 8B:
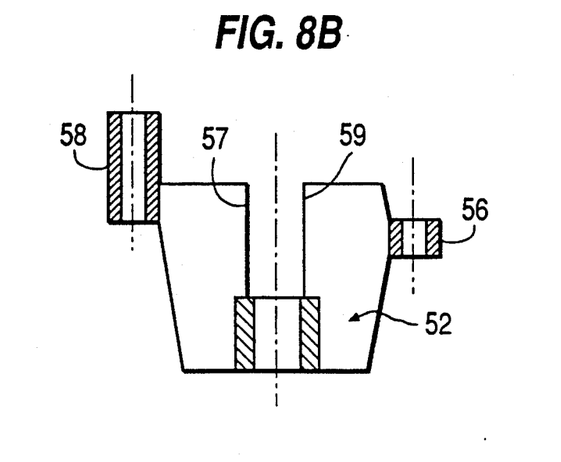
FIG. 8B is a side view of the support bar of the control rod drive housing supports of FIG. 8A.
Figure 8C:
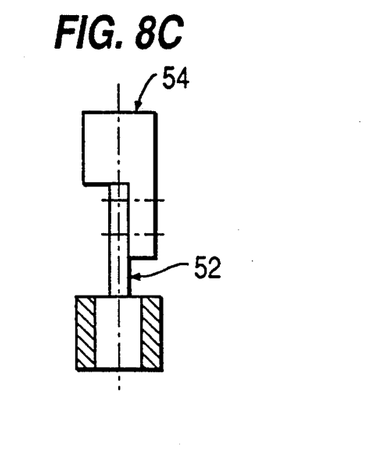
FIG. 8C is another view of the support bar and removable wing assembly of FIGS. 7, 7A and 8B.

The wing assembly 55 is shown in more detail in FIGS. 8A, 8B and 8C. FIG. 8A is a top view of a wing assembly 55 and the support bar 52. The wing assembly 55 has two wing blocks 54 which are bolted to the support bar 52 at 59 when in operation but which can be removed for service of the control rods. For purposes of illustration the wing blocks are shown removed from the hub in FIG. 8A. FIG. 8B illustrates a side view of the support bar 52. The support bar 52 has a hub 58 and 56 for placement over hanger rods 11. As shown in FIGS. 7 and 8B, the hub 58 may be used in a high support position and hub 56 may be used in a low support position. The support bar 52 also has a hole 57 sized to receive the SRM/IRM detector or another instrument therethrough.

FIG. 8C illustrates another view of the support bar 52 and the removable wing block 44. The wing blocks 47 are removable to allow for replacement or service of the SRM/IRM detector or the surrounding control rod drives.

Figure 9:
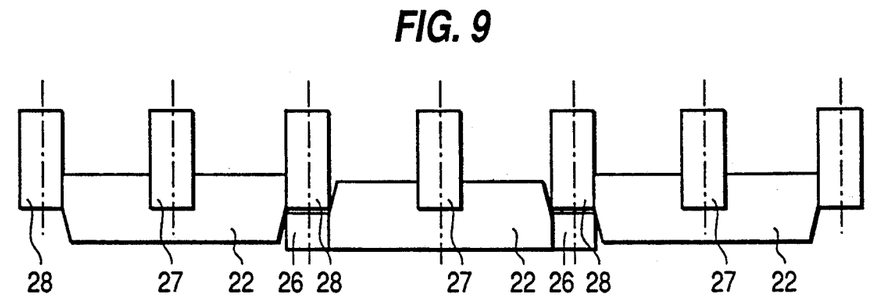
FIG. 9 is a side view of the support bar of the control rod drive housing supports of an embodiment of the present invention.
Figure 10:
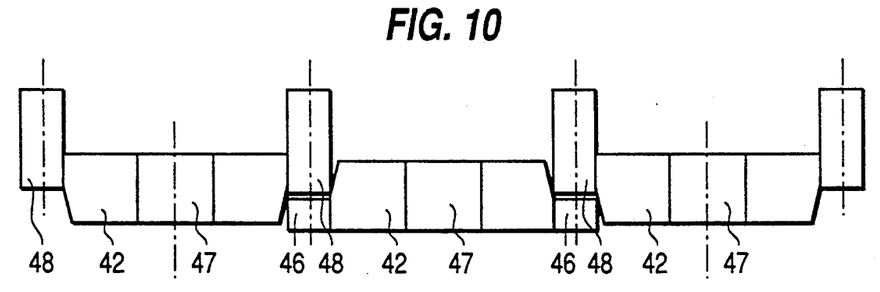
FIG. 10 is a side view of the support bar of the control rod drive housing supports of another embodiment of the present invention.
Figure 11:
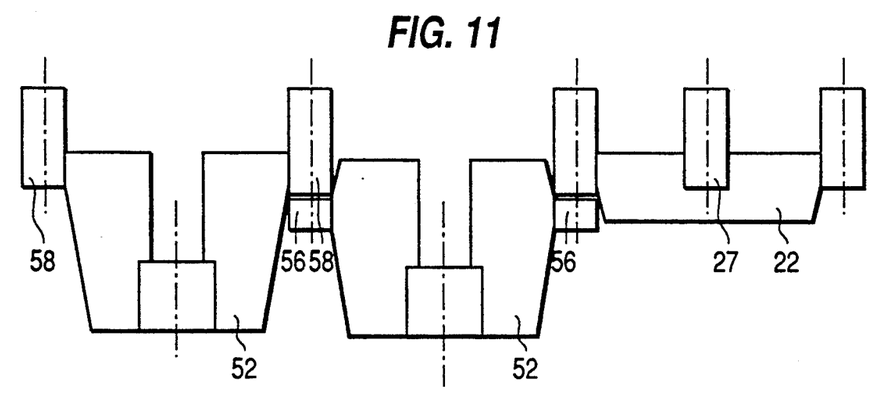
FIG. 11 is a side view of the support bar of the control rod drive housing supports of another embodiment of the present invention.

Alternative support bars for each of the situations described in the above embodiments of the present invention are shown in FIGS. 9, 10 and 11. In the support bar arrangements shown in FIGS. 9, 10 and 11, every other support bar has either an upper or a lower hub. As a result, the total number of support bars used is increased. However, the removal and installation of a specific support is simplified because a maximum of three support bars need be removed in order to access any position. Moreover, for at least half of the positions, only one support bar need be removed. This is to be compared with the main embodiment described above where all the support bars have to be removed from the periphery until the specific bar to be accessed is reached.

FIG. 9 illustrates a row of support bars 22 without any detector positions. The support bars 22 alternately have upper hubs 61 and lower hubs 62. FIG. 10 illustrates a row of support bars with LPRM detector positions. The support bars 42 are also shown having alternately, upper hubs 61 and lower hubs 62. FIG. 11 illustrates a row of support bars with SRM/IRM detector positions. Both the SRM/IRM support bars 52 and the support bar 22 are shown. The support bars 52 are also shown with upper hubs 61 and lower hubs 62. Thus, the present invention provides easy access to the detectors as well as the control rod drives.

The foregoing description of a preferred embodiment of the invention has been presented for purposes of illustration and description. It is not intended to be exhaustive or to limit the invention to the precise form disclosed. Many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

I claim:

1. A support for a control rod drive housing in a boiling water reactor comprising:
    a first means for supporting a control rod drive; and
    a second means for supporting said control rod drive, said second means disposed on said first supporting means wherein said second means is movable on said first supporting means from a support position to a non-support position, whereby said control rod drive is supported by said first and second supporting means when said second means is in said support position and said control rod drive is not supported by said first and second supporting means and can be replaced without removing said second supporting means from said first support means when said second supporting means is in said non-support position.

2. A control rod drive housing support according to claim 1, wherein said first supporting means comprises a plurality of support members provided in rows on opposing sides of a lower portion of a plurality of control rod drives.

3. A control rod drive housing support according to claim 2, wherein said second supporting means comprises a plurality of second support members disposed on said first support members, each of said second support members having a plurality of extension members for supporting said control rod drives, whereby said control rod drive is supported by said extension members when said second support is in said support position and said control rod drive is not supported by said extensions members when said second support is in said non-support position.

4. A control rod drive housing support according to claim 3, wherein said second support is rotatably disposed on said first support member, whereby said extensions are moveable rotatably from said support position to said non-support position and from said non-support position to said support position.

5. A control rod drive housing support according to claim 4, wherein said of first support members have a plurality of hubs for receiving said plurality of second support members rotatably thereon.

6. A control rod drive housing support according to claim 5, wherein said second support member has a hole therethrough for receiving one of said plurality of hubs rotatably therein.

7. A control rod drive housing support according to claim 6, wherein said plurality of extension members on each of said second support member is four, each of said extension members supporting a quadrant of said control rod drive, whereby one extension from four second support members support one control rod drive.

8. A control rod drive housing support according to claim 3, wherein said first support member has a first hole therethrough and said second support member has a second hole therethrough for receiving an instrument to be supported in said control rod drive housing, said second support member having a rim extending beyond said second hole which is rotatably mounted in said first hole of said first support member, whereby said first support member supports both the second support member an said instrument.

9. A control rod drive housing support according to claim 8, wherein said plurality of extension members on each of said second support member is four, each of said extension members supporting a quadrant of said control rod drive, whereby one extension member from four second support members support one control rod drive.

10. A control rod drive housing support according to claim 1, wherein said plurality of extension members on said second support member are removable, whereby said extensions are disposed on said first support member when in said support position and are removed from said first support member when in said non-support position.

11. A control rod drive housing support according to claim 10, wherein said plurality of extension members on said second support member is two, each of said extension members supporting half of said control rod drive.

12. A support for a control rod drive housing in a boiling water reactor comprising:
    a plurality of first support members provided in rows on opposing sides of a lower portion of a plurality of control rod drives; and
    a plurality of second support members disposed on said first support member, said second support member having a plurality of extension members for supporting said control rod drives, wherein said second support member is movable from a support position to a non-support position, whereby said control rod drive is supported by said extension members when said second means is in said support position and said control rod drive is not supported by said extension members and can be replaced without removing said second support means from said first support means when said second support means is in said non-support position.

13. A control rod drive housing support according to claim 12, wherein said second support is rotatably disposed on said first support member, whereby said extensions are moveable rotatably from said support position to said non-support position and from said non-support position to said support position.

14. A control rod drive housing support according to claim 13, wherein said of first support members has a plurality of hubs for receiving a plurality of second support members rotatably thereon.

15. A control rod drive housing support according to claim 14, wherein said second support member has a hole therethrough for receiving one of said plurality of hubs rotatably thereon.

16. A control rod drive housing support according to claim 14, wherein said plurality of extension members on said second support member is four, each of said extension members supporting a quadrant of said control rod drive, whereby one extension from four second support members support one control rod drive.

17. A control rod drive housing support according to claim 13, wherein said first support member has a first hole therethrough and said second support member has a second hole therethrough for receiving an instrument to be supported in said control rod drive housing, said second support member having a rim extending beyond said second hole which is rotatably mounted in said first hole of said first support member, whereby said first support member supports both the second support member an said instrument.

18. A control rod drive housing support according to claim 17, wherein said plurality of extension members on said second support member is four, each of said extension members supporting a quadrant of said control rod drive, whereby one extension from four second support members support one control rod drive.

19. A control rod drive housing support according to claim 12, wherein said plurality of extension members on said second support member are removable, whereby said extensions are disposed on said first support member when in said support position and are removed from said first support member when in said non-support position.

20. A control rod drive housing support according to claim 19, wherein said plurality of extension members on said second support member is two, each of said extension members supporting half of said control rod drive.

* * * * *